Patented May 19, 1936

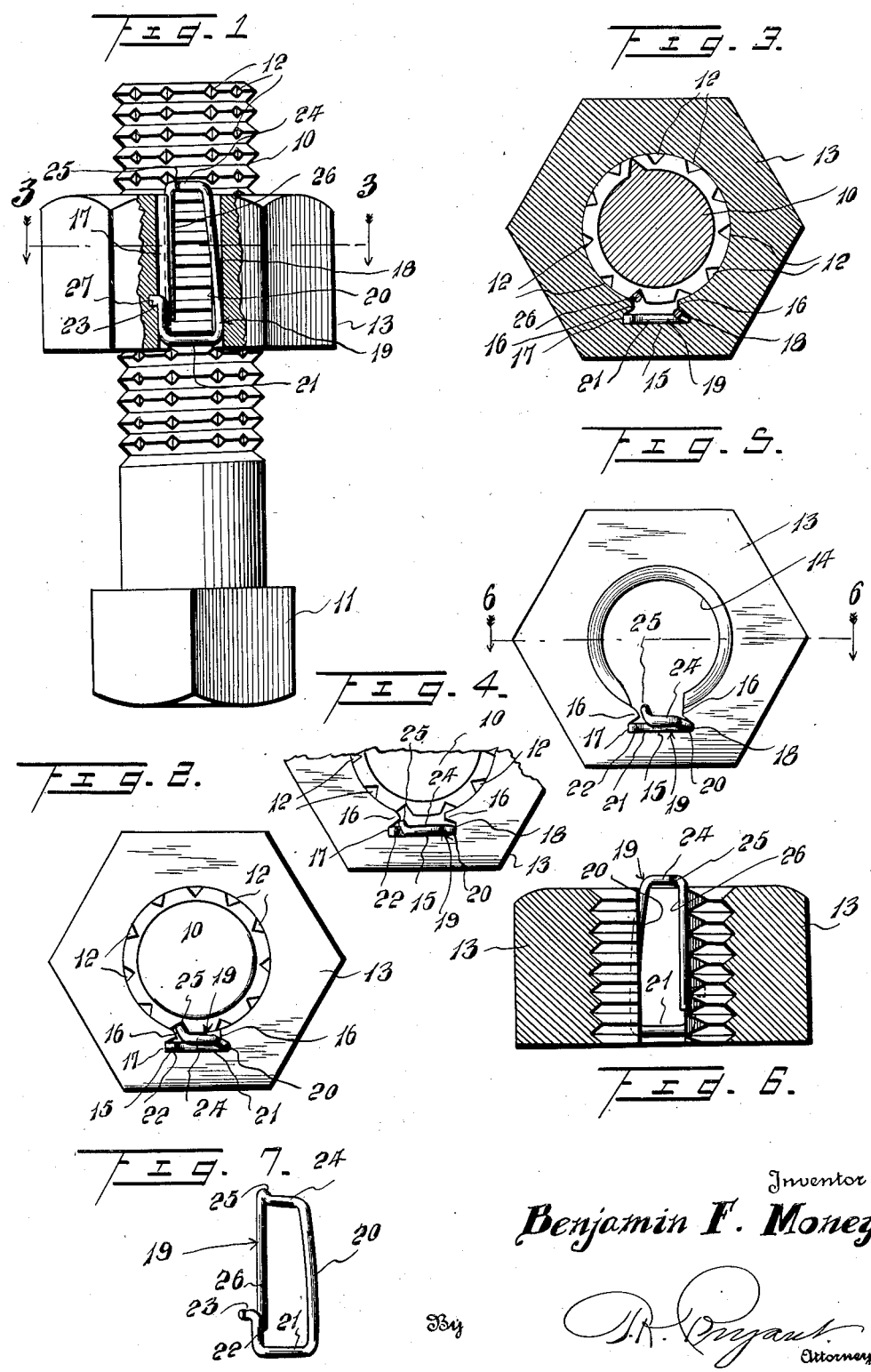

2,041,477

UNITED STATES PATENT OFFICE 2,041,477

NUT LOCK

Benjamin F. Money, Tulsa, Okla.

Application January 24, 1936, Serial No. 60,722

3 Claims. (Cl. 151—11)

This invention relates to certain new and useful improvements in nut locks.

The nut lock disclosed herein is of the general type covered by the patent issued to Benjamin F. Money for improvements in nut locks, dated December 10, 1935, Patent No. 2,024,054 and embodies improvements in the art thereover.

The primary object of the invention is to provide a nut lock wherein a key member is anchored to the wall of the bore in the nut and seated in a groove in the wall with one leg of the key manually displaceable from the groove for ratcheting engagement with ratchet grooves extending longitudinally of a threaded bolt and cooperating with the bolt in a manner to permit clockwise ratcheting rotation of the nut on the bolt and acting to prevent retrograde movement of the nut.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of an assembled nut and screw bolt, with the nut partly shown in section to illustrate the link form of key carried by the nut with one leg thereof positioned for ratcheting engagement with ratchet teeth extending longitudinally of the threaded shank of the bolt;

Figure 2 is an outer end view of the assembled nut and bolt showing the key carried by the nut with one leg thereof positioned for ratcheting engagement with the threaded bolt;

Figure 3 is a cross-sectional view taken on line 3—3 of Figure 1, showing the leg of the key displaced from the groove in the nut for ratcheting engagement with the threaded shank of the bolt;

Figure 4 is a fragmentary outer end elevational view of the assembled nut and bolt, showing the key in its fully retracted position in the groove of the nut and spaced from the threaded shank of the bolt;

Figure 5 is a top plan view of the nut showing the key carried thereby;

Figure 6 is a cross-sectional view taken on line 6—6 of Figure 5, showing the ratcheting leg of the key projecting from the groove of the nut and extending into the bore thereof, and Figure 7 is a perspective view of the key associated with the bolt and nut.

Referring more in detail to the accompanying drawing, the reference character 10 designates the threaded shank of a bolt that carries a polygonal head 11 and the threaded shank 10 is provided with circumferentially spaced longitudinally extending rows of ratcheting grooves 12 cut into the threads of the shank for cooperation with a resilient locking key carried by a nut threaded onto the bolt.

The nut that is threaded onto the bolt is designated by the reference character 13, being of polygonal form with the bore of the nut threaded for engagement with the threaded shank 10 of the bolt. A longitudinally extending groove 15 is cut into the bore of the nut 13 and each side edge of the groove 15 is overhung by a longitudinally extending shoulder 16 defining longitudinal pockets 17 and 18 respectively at opposite sides of the groove 15.

A key for locking the nut 13 onto the threaded shank 10 of the bolt is carried by the nut and when in one position permits freedom of rotation of the nut in either direction on the bolt, but when in another position only clockwise rotation of the nut on the bolt is permitted and retrograde movement of the nut prevented, the locking key being easily shiftable from operative to inoperative positions whenever desired.

The locking key shown in detail in Figure 7 and designated in general by the reference character 19 is preferably formed of resilient wire and of C-shape or link form and embodies a side leg 20 having a relatively short arm 21 extending at right angles from its lower end with a relatively short leg 22 extending at right angles from the arm 21 to lie opposite and substantially parallel with the leg 20. The upper end of the short leg 22 is bent outwardly at right angles to provide an anchor pin 23 for purposes presently to appear. An angularly directed arm 24 extends from the upper end of the leg 20 above the lower arm 21, the free end of the arm 24 being slightly offset as at 25 and carrying a downwardly extending leg 26 that terminates at its lower end in spaced relation to the lower arm 21 and in proximity of the short leg 22. The resiliently inherent end of the locking key 19 normally positions the leg 26 which will hereinafter be referred to as the locking leg in a plane offset and spaced from the short leg 22 and also at an angle to the longitudinal axis of the leg 20.

The locking key 19 is inserted into the groove 15 in the nut 13 through the lower end of the groove, the pin end 23 of the leg 22 being moved, by means of a suitable implement toward the leg 20 to permit complete placement of the locking key in the nut groove and when properly positioned therein, the anchor pin 23 of the locking key enters a socket 27 provided in the bottom wall of the pocket 17 as shown in Figure 1, the resiliency of the locking key retaining the anchor pin 23 in the socket 27 with the lower end of the leg 20 engaged with the opposite pocket 18. When so disposed, the upper arm 24 projects slightly above the upper end of the nut 13 to permit access to the locking key for manual operation thereof to control its position relative to the ratcheting groove 12 of the threaded shank 10 of the bolt.

The locking key 19 is illustrated in Figure 4 of the drawing in its inoperative position with the locking leg 26 confined in the groove 15 by the overhanging shoulder 16 and both of said shoulders 16 act to confine the locking key in the groove in the nut. To cause the locking leg 26 to extend into the bore of the nut for engagement with the ratcheting grooves in the bolt shank, it is only necessary to engage an implement with the offset end 25 of the upper arm 24 and by slight pressure thereon, the upper end of the leg 20 is moved into engagement with the wall of the pocket 18, such movement displacing the locking leg 26 outwardly of the pocket 17 and free of the adjacent overhanging shoulder 16 with inherent resiliency in the locking key projecting the locking leg 26 into the bore of the nut as shown in Figures 5 and 6. From an inspection of Figure 2, it will be noted that the nut 13 rotates freely in a clockwise direction, the locking leg 26 escaping from the ratcheting grooves 12 for movement into the groove 15, but retrograde movement of the nut on the bolt causes the overhanging shoulder adjacent the locking ring 26 to engage the leg and hold the same in the ratcheting groove with such movement of the nut prevented.

When it is desired to remove the nut from the bolt, the nut is preferably rotated to displace the locking leg 26 from a line of ratcheting grooves 12 onto the surface of the threads and at this time, slight pressure on the offset portion 25 of the upper arm 24 in a direction toward the adjacent facet of the nut and also in a direction toward the pocket 18 will cause the locking leg 26 to spring into the pocket 17 and be confined within the groove 15 for free retrograde rotation of the nut on the bolt.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a nut lock of the character described, a threaded bolt having longitudinal rows of ratcheting notches in the threads thereof, a nut threaded on the bolt and having a groove in its threaded bore with an overhanging shoulder at each side of the groove defining side pockets and a resilient locking key having side legs disposed in the pockets, one of the legs being formed of two sections with the section adjacent the bottom of the nut anchored in its pocket and the other section constituting a locking leg shiftable outwardly of the pocket for ratcheting engagement with the grooves in the bolt.

2. In a nut lock of the character described, a threaded bolt having longitudinal rows of ratcheting notches in the threads thereof, a nut threaded on the bolt and having a groove in its threaded bore with an overhanging shoulder at each side of the groove defining side pockets and a resilient locking key having side legs disposed in the pockets, one of the legs being formed of two sections with one section anchored in its pocket and the other section being shiftable outwardly of the pocket for ratcheting engagement with the grooves in the bolt, the other leg having the upper end thereof spaced from the bottom wall of its pocket when the locking leg is engaged with the bolt threads with said upper end moved into the pocket when the locking leg is shifted into its groove pocket.

3. In a nut lock of the character described, a threaded bolt having longitudinal rows of ratcheting notches in the threads thereof, a nut threaded on the bolt and having a groove in its threaded bore with an overhanging shoulder at each side of the groove defining side pockets and a resilient locking key having side legs disposed in the pockets, one of the legs being formed of two sections with the section adjacent the bottom of the nut anchored in its pocket and the other section constituting a locking leg shiftable outwardly of the pocket for ratcheting engagement with the grooves in the bolt, the other leg having the upper end thereof spaced from the bottom wall of its pocket when the locking leg is engaged with the bolt threads with said upper end moved into the pocket when the locking leg is shifted into its groove pocket.

BENJAMIN F. MONEY.